(12) United States Patent
Langer et al.

(10) Patent No.: US 11,680,493 B2
(45) Date of Patent: Jun. 20, 2023

(54) ANTI-ROTATION PIN FOR COMPRESSION FITTING

(71) Applicant: UNITED TECHNOLOGIES CORPORATION, Farmington, CT (US)

(72) Inventors: Alexander S. Langer, Milford, CT (US); Marcus Damien Baltrucki, Marlborough, CT (US); Corey A. Benoit, Uncasville, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1402 days.

(21) Appl. No.: 16/011,953

(22) Filed: Jun. 19, 2018

(65) Prior Publication Data

US 2019/0383159 A1 Dec. 19, 2019

(51) Int. Cl.
| | |
|---|---|
| *F01D 17/02* | (2006.01) |
| *F16B 37/14* | (2006.01) |
| *F16B 21/20* | (2006.01) |
| *F16B 19/02* | (2006.01) |
| *F16B 41/00* | (2006.01) |

(52) U.S. Cl.
CPC .............. *F01D 17/02* (2013.01); *F16B 19/02* (2013.01); *F16B 21/20* (2013.01); *F16B 37/14* (2013.01); *F16B 41/002* (2013.01); *F05D 2230/64* (2013.01); *F05D 2260/31* (2013.01)

(58) Field of Classification Search
CPC .......... F01D 17/02; F16B 19/02; F16B 21/20; F16B 37/14; F16B 41/002; F05D 2230/64; F05D 2260/31; F05D 2260/30; F05D 2270/80
See application file for complete search history.

(56) References Cited

U.S. PATENT DOCUMENTS

| | | | |
|---|---|---|---|
| 5,344,195 A | 9/1994 | Parimore, Jr. et al. | |
| 6,070,984 A | * 6/2000 | Kusik | B60R 1/081 359/872 |
| 9,038,479 B2 | 5/2015 | Langer | |
| 9,476,420 B2 | 10/2016 | Makino | |
| 2008/0194169 A1 | * 8/2008 | Sterling | H01L 21/68785 445/73 |
| 2014/0028020 A1 | * 1/2014 | Langer | F01D 17/08 285/353 |
| 2017/0328138 A1 | 11/2017 | Loose-Mitchell et al. | |

* cited by examiner

*Primary Examiner* — Jacob M Amick
*Assistant Examiner* — Charles J Brauch
(74) *Attorney, Agent, or Firm* — Snell & Wilmer L.L.P.

(57) ABSTRACT

A compression fitting is provided. The compression fitting may include a body, a follower, and a pin, and a cap nut. The follower may be disposed within an axial cavity of the body. The pin may be coupled with the follower. The cap nut may be coupled with the body. An internal edge of the cap nut radially overlaps at least a portion of a forward edge of the pin.

20 Claims, 8 Drawing Sheets

ANTI-ROTATION PIN FOR COMPRESSION FITTING

FIELD

The present disclosure relates to compression fittings and more particularly to a compression fitting for mounting a sensor to an apparatus such as a gas turbine engine.

BACKGROUND

Gas turbine engines may include a plurality of sensors at various locations. Sensor leads may extend through compression fittings. To prevent twisting or torque shearing of the leads in the compression fitting, a follower may axially translate within the fitting body without rotation. Compression fitting may include an anti-rotation pin which engages the follower and fitting body to prevent rotation of the follower as it translates axially through the fitting body in compressing the fitting seal. Anti-rotation pins may be inadvertently omitted from the sensor fitting, thereby allowing the follower to rotate as it is moved axially to compress the seal material within the fitting, thus damaging or severing the leads extending through the follower. Anti-rotation pins may also separate from the fitting, to be ingested by the engine, thereby posing a threat to engine components.

SUMMARY

According to various embodiments, a compression fitting is described herein. The compression fitting may include a body, a follower, and a pin, and a cap nut. The follower may be disposed within the axial cavity of the body. The pin may be coupled with the follower. The cap nut may be coupled with the body. An internal edge of the cap nut radially overlaps at least a portion of a forward edge of the pin. In various embodiments, the pin may rotationally constrain the follower as the follower axially translates within the body as the cap nut is engaged. In various embodiments, a forward end of the pin comprises a countersink shape. In various embodiments, a forward end of the pin comprises a counterbore shape. In various embodiments, the pin may include threads configured to engage with the follower. In various embodiments, the pin may be engaged with the follower by a tack weld. In various embodiments, the pin may be engaged with the follower by press fitting. In various embodiments, the pin may include a magnetic material. In various embodiments, the compression fitting may include a plurality of pins coupled with the follower.

According to various embodiments, a gas turbine engine is described herein. The gas turbine engine may include a compression fitting. The compression fitting may include a body comprising an axial cavity, a follower, and a pin, and a cap nut. The follower may be disposed within the axial cavity of the body. The pin may be coupled with the follower. The cap nut may be coupled with the body. An internal edge of the cap nut radially overlaps at least a portion of a forward edge of the pin. In various embodiments, the pin may rotationally constrain the follower as the follower axially translates within the body as the cap nut is engaged. In various embodiments, a forward end of the pin comprises a countersink shape. In various embodiments, a forward end of the pin comprises a counterbore shape. In various embodiments, the pin may include threads configured to engage with the follower. In various embodiments, the pin may be engaged with the follower by a tack weld. In various embodiments, the pin may be engaged with the follower by press fitting. In various embodiments, the pin may include a magnetic material. In various embodiments, the compression fitting may include a plurality of pins coupled with the follower.

According to various embodiments, method of manufacturing a compression fitting is described herein. The method may include coupling a pin with a follower, wherein the follower is within an axial cavity of a body of the compression fitting. The method may include engaging an interior surface of a cap nut with a forward end of the body, wherein an internal edge of the cap nut overlaps at least a portion of a forward edge of the pin. In various embodiments, the coupling a pin radially with a follower comprises engaging a threaded portion of the pin with a threaded portion of the follower. In various embodiments, the coupling a pin with a follower comprises press fitting the pin with the follower.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft braking systems. However, various aspects of the disclosed embodiments may be adapted for performance in a variety of other systems. As such, numerous applications of the present disclosure may be realized.

Figure 1:
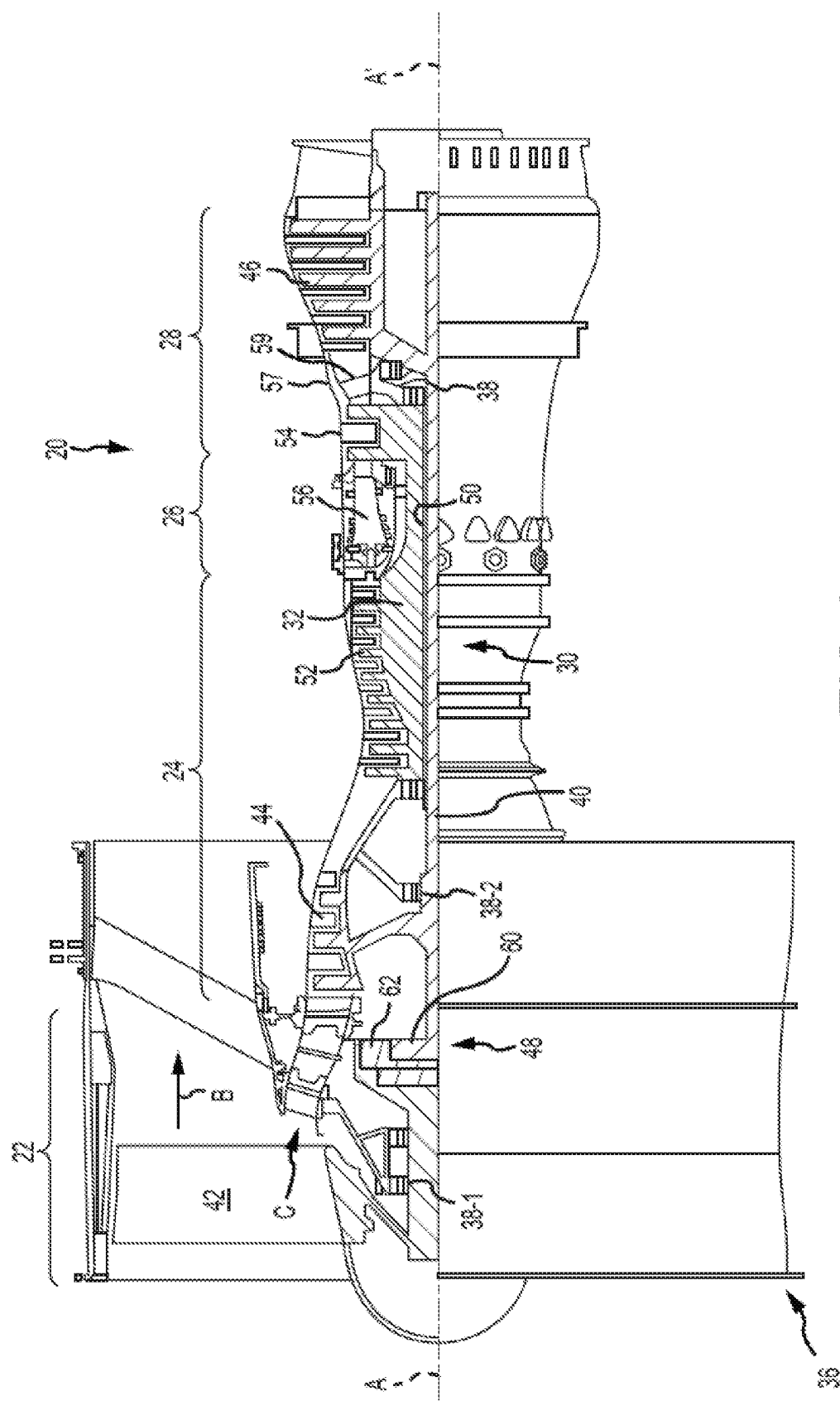
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46 and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

Figure 2:
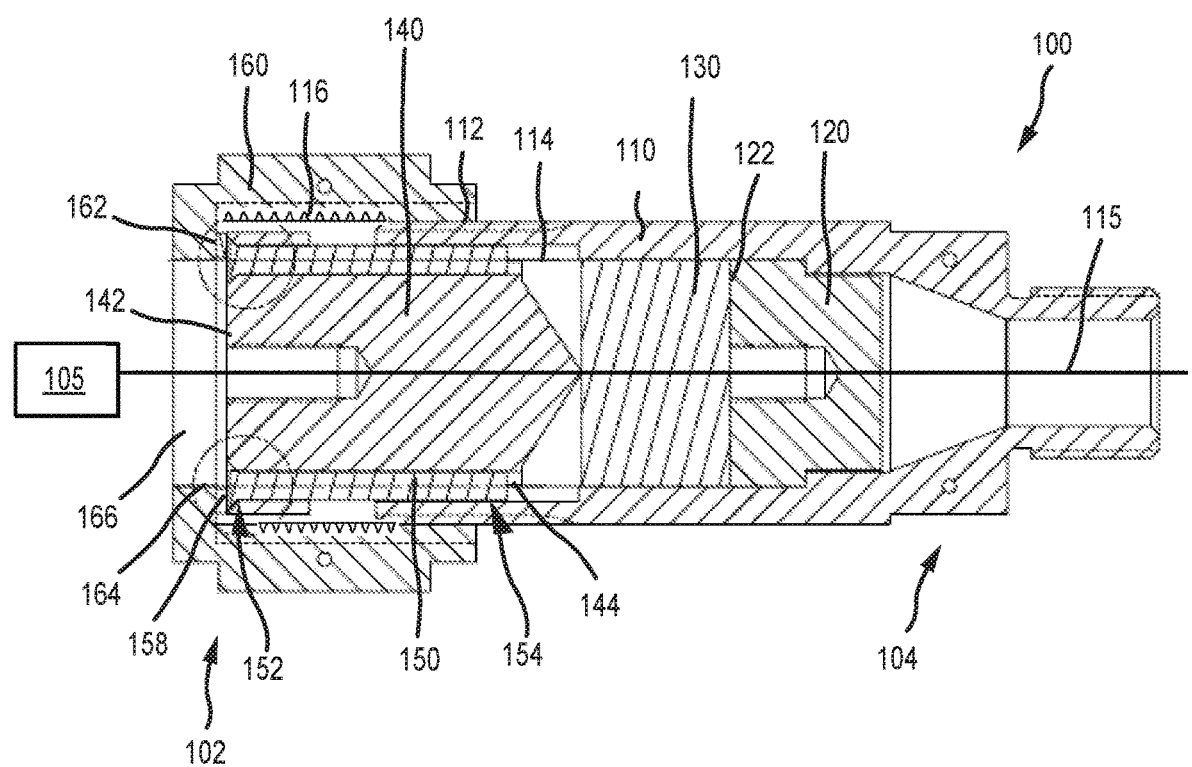
FIG. 2 illustrates a cross section of a compression fitting in accordance with various embodiments.

With reference to FIG. 2, compression fitting 100 is illustrated in accordance with various embodiments. Compression fitting 100 may comprise forward end 102 and aft end 104. Compression fitting 100 may be disposed within gas turbine engine 20, for example, in relation to a sensor 105 that measures an operating parameter such as temperature or pressure of working fluid or vibration of a component. Compression fitting 100 may mount to gas turbine engine 20. Compression fitting 100 may include a body or housing portion 110. Body 110 may be externally threaded at a first end portion 112, the threads 116 on body 100 engaging mating threads on at least one a cap nut 160 or a housing of gas turbine engine 20 for firmly mounting the fitting. Body 110 may include a generally cylindrical axial cavity 114 extending through body 110. Axial cavity 114 may accommodate axially extending signal carrying leads 115 which may connect to a sensor to provide signals therefrom to signal processing apparatus which processes signals carried by leads 115. Axial cavity 114 may be cylindrical in cross section.

The sensor 105 as described above may be any known type of sensor such as any of various electrical sensors such as a thermoelectric sensor such as a thermocouple or an electrical sensor such as an accelerometer. The sensor 105 may also be a fluid mechanical sensor such as a pressure sensor or equivalent thereof for measuring fluid pressure of working fluid flowing through gas turbine engine 20. Where the sensor 105 is an electrical sensor, the leads are electrical conductors such as wires. Where the operating parameter measured by the sensor is a fluid mechanical parameter such as working fluid pressures within a gas turbine engine, the leads may be tubes for transmitting a fluid mechanical signal to the signal processing apparatus.

Compression fitting 100 may comprise seat 120. Seat 120 may be housed within body 100 at an aft end of axial cavity 114. Seat 120 may comprise a forward endwall 122 on which a conforming aft endwall of a seal 130 is seated. Seal 130 is formed from any suitable compressible material compatible with the operational environment of the fitting of the present invention. For example, in low temperature environments, seal 130 may be formed from an elastomeric material such as any of various known synthetic rubbers or the like. In high temperature environments such as those encountered in gas turbine engines, seal 130 may be formed from a metallic material such as a relatively soft compressible metallic material such as lead or a harder metallic material formed in a honeycomb. Seal 130 may accommodate leads 115 extending through compression fitting 100.

Seal 130 may be compressed into sealing engagement with seat 120 by follower 140, which is rectilinearly movable in an axial direction within axial cavity 114. Follower 140 may be generally cylindrical in cross section and may conform to the cylindrical shape of axial cavity 114. Follower 140 may be disposed within axial cavity 114 of body 110. Follower 140 may be rectilinearly movable in an axial direction for compression of seal 130 by cap nut 160. Cap nut 160 may be disposed radially outward of body 110 and may engage with body 110. Cap nut 160 may also be disposed axially outward of body 110 and may engage with body 110. For example, cap nut 160 may be internally threaded such that it may be threaded onto threads 116 at a first end portion 112 of body 110. As cap nut 160 is engaged with body 110, an interior surface 162 of cap nut 160 may engage with forward edge 142 of follower 140. Interior surface 162 of cap nut 160 may abut forward edge 158 of pin 150. Follower 140 may slide toward seal 130 for compressive engagement. Cap nut 160 may comprise an internal edge 164 which defines an opening 166. Opening 166 may accommodate the extension of leads 115 for connection to a signal processing apparatus.

Compression fitting 100 may comprise a pin 150. Pin 150 may comprise forward end 152 and aft end 154. Pin 150 may be coupled with follower 140. Forward edge 158 of pin 150 may be in line with forward edge 142 of follower 140. In various embodiments, forward edge 158 of pin 150 may be disposed more aft than forward edge 142 of follower 140. Follower 140 may comprise pin slot 144. Pin 150 may generally conform to follower 140 or pin slot 144. Pin 150 may be translated in an aft direction and be received within follower 140 or pin slot 144. Pin 150 may be received by follower 140 before cap nut 160 is engaged with body 110. Pin 150 may prevent rotation of follower 140 by cap nut 160 in response to cap nut 160 being engaged with body 110. Pin 150 may rotationally constrain follower 140 as follower 140 axially translates within axial cavity 114 as cap nut 160 is rotated. Such rotational constraint may ensure that leads 115 are not twisted, damaged or otherwise compromised by unwanted rotation of follower 140 as follower 140 translates within axial cavity 114. Internal edge 164 of cap nut 160 may radially overlap at least a portion of forward edge 158 pin 150 and may prevent pin 150 from translating through opening 166 of cap nut 160. Compression fitting 100 may comprise a plurality of pin 150 coupled with follower 140. As shown in FIG. 2, compression fitting 100 may comprise two pins disposed 180 degrees apart along follower 140.

Pin 150 may be machined or cast into follower 140 or formed separately therefrom and attached thereto as by welding, brazing or the like or mechanical attachment thereto by threaded engagement, press-fitting or equivalent attachment schemes. Pin 150 may comprise a magnetic material. While follower 140 has been illustrated and described as having a single pin, it will be understood that a plurality of pins each disposed within a single follower may be used. Additionally, the pins may be semi-integrated with the follower by attachment thereto by a threaded engagement or equivalent mechanical attachment (as by welding, brazing or the like) thereto. As described below, pins may also be attached to the follower by press fitting thereto. Also, while the disclosure describes with a single follower accommodating a single conforming pin, it will be appreciated that multiple pins may be employed in compression fitting 100.

Figure 3A:
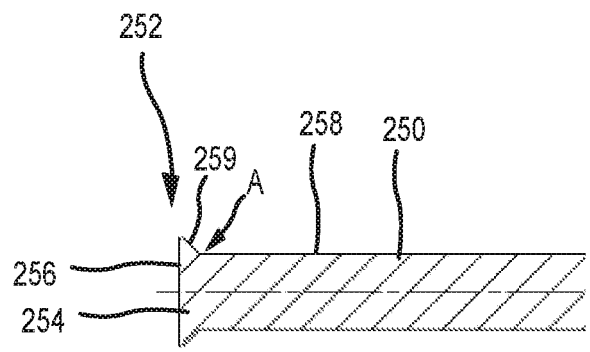
FIG. 3A illustrates a cross section of a pin in accordance with various embodiments.
Figure 3B:
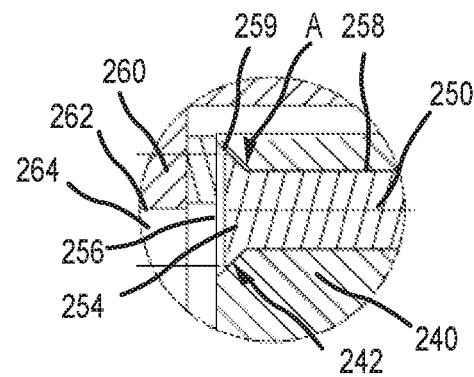
FIG. 3B illustrates a cross section of a pin in a compression fitting in accordance with various embodiments.
Figure 3C:
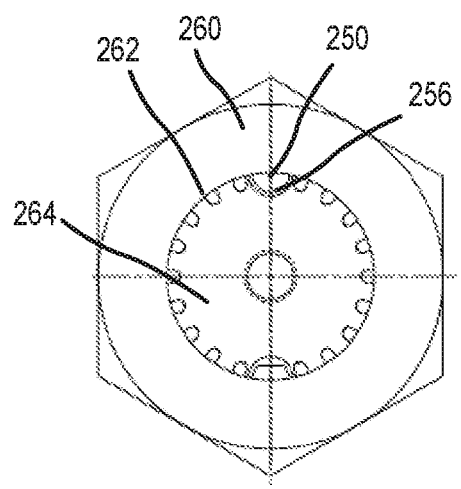
FIG. 3C illustrates a side view of a compression fitting with a pin in accordance with various embodiments.

In various embodiments, and with reference to FIG. 3A-FIG. 3C, forward end 252 of pin 250 may comprise countersink 254. Forward edge 256 may be joined with pin side 258 via angled edge 259. Angled edge 259 may be disposed at angle A relative to pin side 258. Angle A may be between about 0 and about 180 degrees. Countersink 254 may engage with countersink pocket 242 of follower 240. Internal edge 262 of cap nut 260 may abut and radially overlap at least a portion of forward edge 256 of pin 250 and may prevent pin 250 from translating through opening 264 of cap nut 260.

Figure 4A:
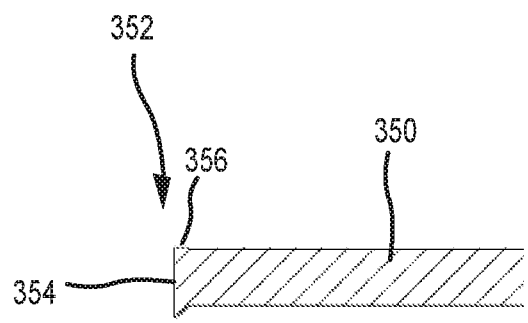
FIG. 4A illustrates a cross section of a pin in accordance with various embodiments.
Figure 4B:
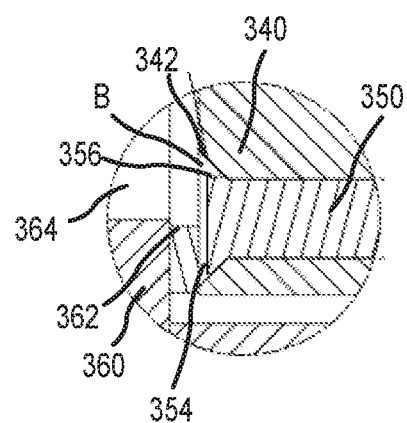
FIG. 4B illustrates a cross section of a pin in a compression fitting in accordance with various embodiments.
Figure 4C:
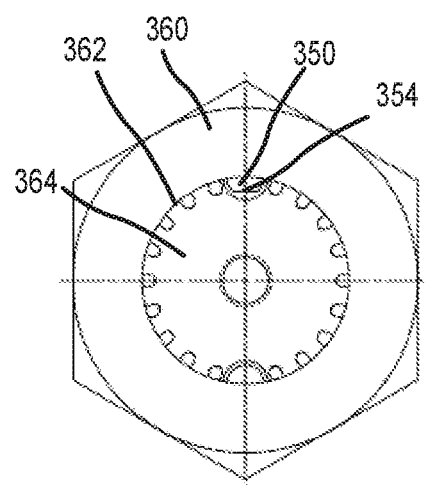
FIG. 4C illustrates a side view of a compression fitting with a pin in accordance with various embodiments.

In various embodiments, and with reference to FIG. 4A-FIG. 4C, forward end 352 of pin 350 may comprise forward edge 354 and flat edge 356. Flat edge 356 may be a distance B from edge 342 of follower 340. The distance B between flat edge 356 and follower edge 342 allows facilitation of the removal of pin 350 when cap nut 360 is not engaged with body 110. Pin 350 may comprise one or more flat edges 356 disposed about forward edge 354. Internal edge 362 of cap nut 360 may abut and overlap at least a portion of forward edge 354 of pin 350 and may prevent pin 350 from translating through opening 364 of cap nut 360.

Figure 5A:
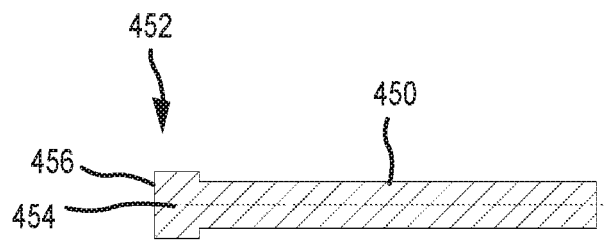
FIG. 5A illustrates a cross section of a pin in accordance with various embodiments.
Figure 5B:
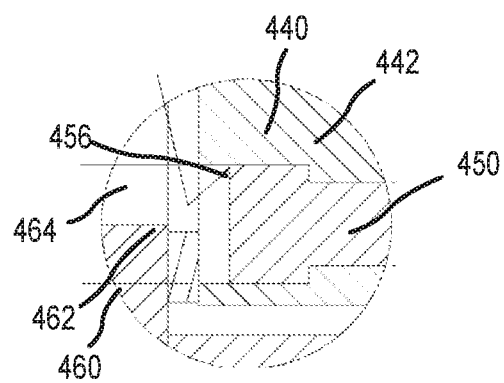
FIG. 5B illustrates a cross section of a pin in a compression fitting in accordance with various embodiments.
Figure 5C:
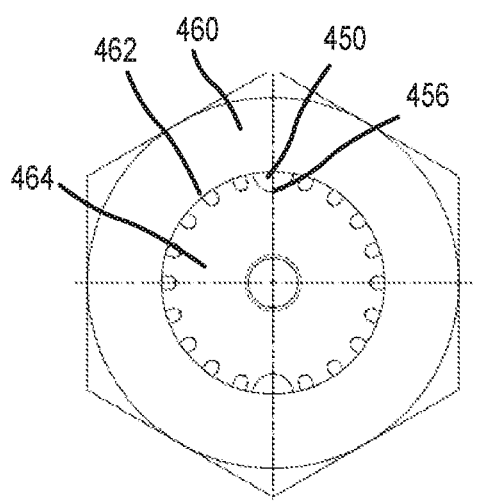
FIG. 5C illustrates a side view of a compression fitting with a pin in accordance with various embodiments.

In various embodiments, and with reference to FIG. 5A-5C, forward end 452 of pin 450 may comprise counterbore 454. Pin 450 may be joined with follower 440 via a tack weld to retain pin 450. Counterbore 454 may engage with a counterbore pocket 442 of follower 440. Internal edge 462 of cap nut 460 may abut and overlap at least a portion of forward edge 456 of pin 450 and may prevent pin 450 from translating through opening 464 of cap nut 460.

Figure 6A:
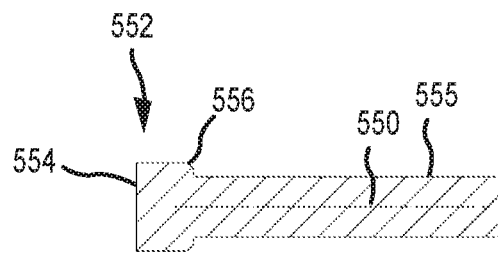
FIG. 6A illustrates a cross section of a pin in accordance with various embodiments.
Figure 6B:
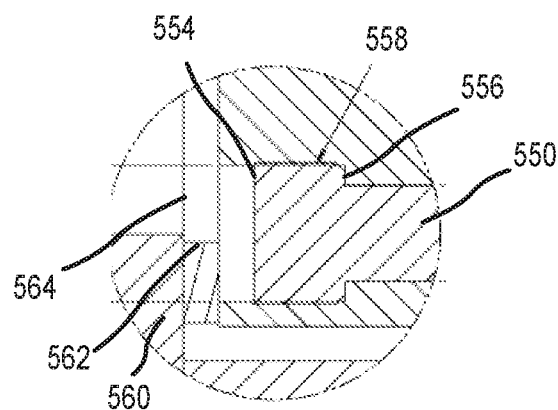
FIG. 6B illustrates a cross section of a pin in a compression fitting in accordance with various embodiments.
Figure 6C:
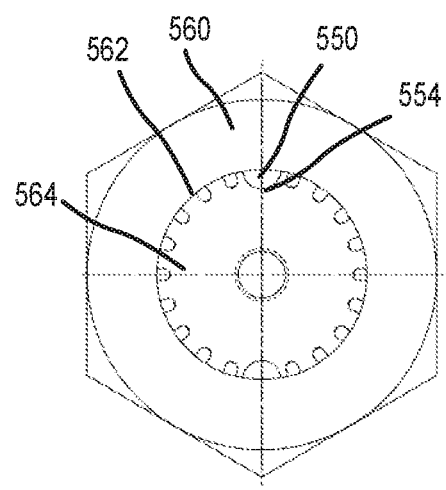
FIG. 6C illustrates a side view of a compression fitting with a pin in accordance with various embodiments.

In various embodiments, and with reference to FIG. 6A-6C, forward end 552 of pin 550 may comprise forward edge 554 and pin corner 556. Pin 550 may be coupled with follower 540 by pressfitting. Specifically, pin corner 556 may be pressfit with follower 540. Pin head edge 558 may also be pressfit with follower 540. Finally, pin body edge 555 may be pressfit with follower 540. Pin corner 556 may be at least partially rounded. Internal edge 562 of cap nut 560 may define opening 564. Internal edge 562 of cap nut 560 may abut and overlap at least a portion of forward edge 554 of pin 550 and may prevent pin 550 from translating through opening 564 of cap nut 560.

Figure 7A:
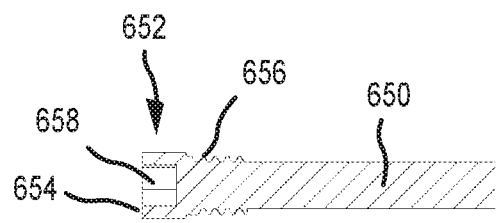
FIG. 7A illustrates a cross section of a pin in accordance with various embodiments.
Figure 7B:
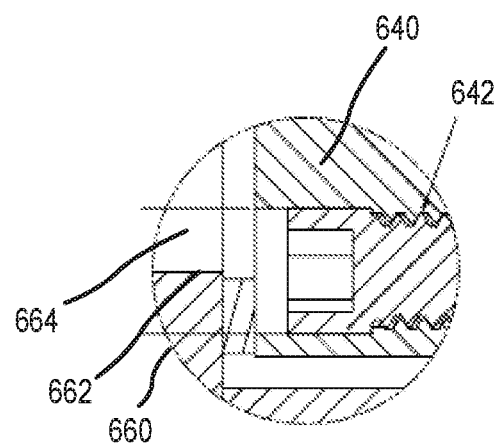
FIG. 7B illustrates a cross section of a pin in a compression fitting in accordance with various embodiments.
Figure 7C:
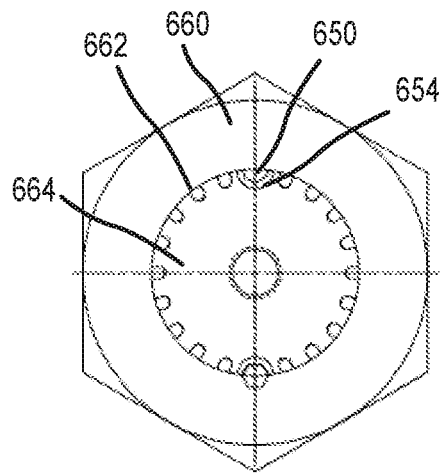
FIG. 7C illustrates a side view of a compression fitting with a pin in accordance with various embodiments.

In various embodiments, and with reference to FIG. 7A-7C, forward end 652 of pin 650 may comprise forward edge 654 and pin threads 656. Follower 640 may have follower threads 642. Pin 650 may be coupled with follower 640 through the engagement of threads 656 of pin 650 with threads 642 of follower 640. Pin 650 may comprise slot 658. Slot 658 may be configured to engage a screwdriver or other fastening mechanism to facilitate the engagement of pin 650 and follower 640. Internal edge 662 of cap nut 660 may abut and overlap at least a portion of forward edge 654 of pin 650 and may prevent pin 650 from translating through opening 664 of cap nut 660.

Figure 8:
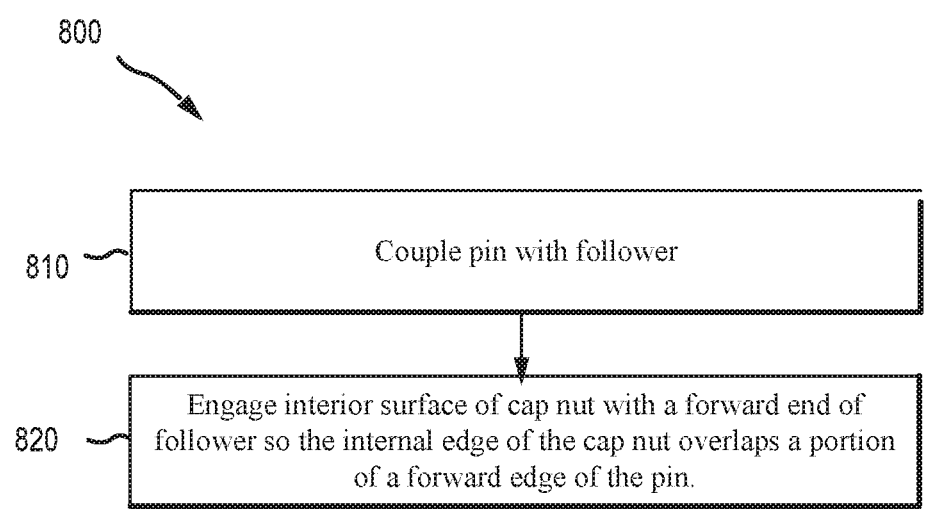
FIG. 8 illustrates a flow diagram of a process for manufacturing an anti-rotation pin for use in a compression fitting in accordance with various embodiments.

In various embodiments, and with reference to FIG. 8, a method of manufacturing a compression fitting 800 is illustrated. A pin 150 may be coupled with a follower 140 (step 810). The follower may be disposed within an axial cavity of a body of the compression fitting An opening 166 of cap nut 160 may be engaged with a forward edge 142 of body 110 such that an internal edge 164 of the cap nut 160 may overlap at least a portion of a forward edge 158 the pin 150 (step 820). Pin 150 may be coupled with follower 140 via at least one of press fitting or engaging threads 656 of pin 650 with threads 642 of follower 640.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A compression fitting comprising:
a body comprising an axial cavity;
a follower disposed within the axial cavity of the body;
a pin having a forward end with a forward edge, the forward end of the pin configured to engage with the follower; and
a cap nut coupled with the body, wherein an internal edge of the cap nut radially overlaps at least a portion of the forward edge of the pin, and wherein an internal edge of the cap nut abuts the forward edge of the pin.

2. The compression fitting of claim 1, wherein the forward end of the pin rotationally constrains the follower as the follower axially translates within the body as the cap nut is engaged.

3. The compression fitting of claim 1, wherein the forward end of the pin comprises a countersink shape.

4. The compression fitting of claim 1, wherein the forward end of the pin comprises a counterbore shape.

5. The compression fitting of claim 1, wherein the pin comprises threads configured to engage with the follower.

6. The compression fitting of claim 1, wherein the pin is configured to engage with the follower by a tack weld.

7. The compression fitting of claim 1, wherein the pin is configured to engage with the follower by press fitting.

8. The compression fitting of claim 1, wherein the pin comprises a magnetic material.

9. The compression fitting of claim 1, further comprising a plurality of pins, wherein each of the plurality of pins includes a forward edge coupled configured to engage with the follower.

10. A gas turbine engine comprising:
a compression fitting, wherein the compression fitting comprises:
a body comprising an axial cavity;
a follower disposed within the axial cavity of the body;
a pin having a forward end with a forward edge, the forward end of the pin configured to engage with the follower; and
a cap nut coupled with the body, wherein an internal edge of the cap nut radially overlaps at least a portion of the forward edge of the pin, and wherein an internal edge of the cap nut abuts the forward edge of the pin.

11. The gas turbine engine of claim 10, wherein the forward end of the pin comprises a countersink shape.

12. The gas turbine engine of claim 10, wherein the forward end of the pin comprises a counterbore shape.

13. The gas turbine engine of claim 10, wherein the pin is configured to engage with the follower by a tack weld.

14. The gas turbine engine of claim 10, wherein the pin comprises threads configured to engage with the follower.

15. The gas turbine engine of claim 10, wherein the pin is configured to engage with the follower by press fitting.

16. The gas turbine engine of claim 10, wherein the pin comprises a magnetic material.

17. The gas turbine engine of claim 10, wherein the compression fitting further comprises a plurality of pins, wherein each of the plurality of pins includes a forward edge configured to engage with the follower.

18. A method of manufacturing a compression fitting, comprising:
   inserting a follower into an axial cavity of a body of the compression fitting;
   inserting a pin to engage the follower, the pin including a forward end with a forward edge, the forward end of the pin engaging the follower; and
   engaging an interior surface of a cap nut with a forward end of the body, wherein an internal edge of the cap nut overlaps at least a portion of the forward edge of the pin, and wherein an internal edge of the cap nut abuts the forward edge of the pin.

19. The method of claim 18, wherein the inserting the pin comprises engaging a threaded portion of the pin with a threaded portion of the follower.

20. The method of claim 18, wherein the inserting the pin comprises press fitting the pin with the follower.

* * * * *